Patented Aug. 12, 1924.

1,504,837

UNITED STATES PATENT OFFICE.

HARRY RALPH RICARDO, OF LONDON, ENGLAND.

FUEL FOR USE IN INTERNAL-COMBUSTION ENGINES.

No Drawing.    Application filed March 24, 1922.   Serial No. 546,445.

*To all whom it may concern:*

Be it known that I, HARRY RALPH RICARDO, a subject of the King of England, and residing at London, in England, have invented certain new and useful Improvements in Fuel for Use in Internal-Combustion Engines, of which the following is a specification.

This invention relates to fuel for use in internal combustion engines and has for its object to provide a composition constituting a liquid fuel which will have the effect of increasing the volumetric efficiency of the engine and lowering the mean temperature of the cycle performed by the engine.

If it is possible to introduce into the cylinder with the charge a certain proportion of water in a highly pulverized state, it becomes practicable to make use of the latent heat of evaporation of the water with certain resultant advantages. Thus the inlet valve and its surrounding walls may be cooled together with the piston, exhaust valves and sparking plug points. The residual exhaust gases are also cooled and it is possible to absorb some of the heat from the compressed charge and tend to render the compression of this charge isothermal. The whole temperature of the cycle performed by the engine may thus be reduced with a proportional reduction in the heat loss to the cylinder walls. Yet further, the presence of water vapour in the compressed working fluid greatly reduces the tendency to detonate and so permits of a higher compression pressure being used while the maximum explosion pressure is also reduced.

The introduction of water separately from the fuel supply in the form of a sufficiently fine spray cannot be conveniently effected without great difficulty and it is therefore desirable to introduce the water, if possible, with the liquid fuel in such a way that the water will enter the cylinder in a liquid and highly pulverized state.

According to this invention there is employed a composition constituting a liquid fuel comprising acetone, benzene or benzol, and water in solution with or without the addition of ethyl or methyl alcohol. With the benzene or benzol there may be an amount of acetone sufficient to hold in solution a total of at least 8% by weight of water.

If ethyl or methyl alcohol is employed in the composition, this may be in an amount which is equal to or in excess of the combined amounts of acetone and benzene or benzol. In the preferred composition the liquid fuel is mainly composed of ethyl alcohol with a less amount of acetone and a still less quantity of benzene or benzol while the amount of water in solution may be approximately equal to the amount of benzene or benzol.

Though ethyl alcohol alone will carry a sufficient proportion of water in solution, the normal vapour tension is so low that a considerable amount of pre-heating is required in order to volatilize it. Such pre-heating results in the evaporation of a proportion of the fuel and its water content before entering the cylinder and consequently it is necessary for the fuel to carry in solution a still larger water content if the desired effects are to be obtained. Methyl alcohol being more volatile requires less pre-heating and in some respects is more suitable for use than ethyl alcohol but its great cost combined with its very low calorific value prevents the use of methyl alcohol in practice. Acetone which is also a solvent of water and usable as a fuel, though very volatile, has also a very low calorific value and is extremely costly. Hence, in practice, it does not appear economically possible to use either of these substances alone as the vehicle for the introduction of the water into the cylinder.

By adding a small proportion of benzene or benzol to ethyl alcohol, the vapour tension of the composition can be raised appreciably and to such an extent as to make it possible to use such a composition as a fuel without pre-heating apart from such small degree of pre-heating which is always necessary to prevent the freezing of a volatile fuel. While raising the vapour tension of ethyl alcohol the addition of benzene or benzol also increases its calorific value but the effect of the mixture is to cause water to separate out and thus such a composition is not available for the desired purpose. It has been found, however, that the presence of a relatively small proportion of acetone will permit of water being retained in solution in a mixture of benzene or benzol and alcohol by reason of the fact that acetone is a solvent both of water and of benzene. Hence, as indicated above, by employing a mixture of ethyl or methyl alcohol, benzene or benzol, acetone and water there is obtained a liquid fuel which can be employed with the desired results. This mixture can have a vapour tension higher than that of benzene or benzol and consequently requires less pre-heating, while the mixture can be employed in a carburettor of normal type adjusted, so far as heating is concerned, as for use with ordinary commercial benzol or petrol. In some cases it is possible to use a mixture of acetone and benzene or benzol with water in solution without the addition of alcohol but for practical purposes, having regard to the relative cost of the substances, it is preferable to form the composition as to its major portion of ethyl alcohol with such proportions of acetone and benzene or benzol as may be necessary to enable the desired quantity of water to be held in solution. As an example, a fuel composition may comprise 60% of ethyl alcohol, 20% of acetone, 10% of benzene or benzol and 10% of water in solution.

The proportion of water required to give the best results in any given instance depends to some extent on the amount of pre-heating provided and on the degree of pulverization of the fuel effected in the carburettor. It must depend also and be governed to some extent by the latent heat of evaporation of the remainder of the fuel. In any event, the water content should represent not less than 8% by weight of the total fuel. In some instances, the water content may be increased with advantage to as much as 16% depending on the proportionate composition of the fuel, upon the compression ratio of the engine, the heat input to the mixture, that is the heat imparted to the fuel and air before admission to the cylinder and the degree of the pulverization of the fuel.

Where a higher vapour tension is required for the fuel in consequence of defective distribution or for other reasons, a small proportion of ether may be added to the composition. In such a case the tendency of ether to detonate is counteracted by the presence of water vapour in the working fluid.

What I claim as my invention and desire to secure by Letters Patent is:—

1. A composition constituting a liquid fuel for use in an internal combustion engine comprising benzol, acetone in amount not less than that of the benzol, and water the total proportion of water being not less than 8% by weight of the composition.

2. A composition constituting a liquid fuel for use in an internal combustion engine comprising benzol, acetone in amount not less than that of the hydrocarbon, alcohol the amount of which is not less than the combined amounts of acetone and the benzol, and water the total proportion of which is not less than 8% by weight of the composition.

3. A composition constituting a liquid fuel for use in an internal combustion engine comprising acetone, benzol, ethyl alcohol, and water in solution, the total proportion of water being not less than 8% by weight of the composition.

4. A composition constituting a liquid fuel for use in an internal combustion engine comprising in combination in substantially the proportions given by weight, 60% ethyl alcohol, 20% acetone, 10% benzol, and 10% water in solution as set forth.

In testimony whereof I have signed my name to this specification.

HARRY RALPH RICARDO.